(12) United States Patent
Hämäläinen et al.

(10) Patent No.: US 7,548,527 B2
(45) Date of Patent: Jun. 16, 2009

(54) SECURING A CONNECTION IN A RADIO SYSTEM

(75) Inventors: Jyri Hämäläinen, Oulu (FI); Esa Tiirola, Oulu (FI)

(73) Assignee: Nokia Corporation, Epsoo (FI)

( * ) Notice: Subject to any disclaimer, the term of this patent is extended or adjusted under 35 U.S.C. 154(b) by 845 days.

(21) Appl. No.: 10/448,466

(22) Filed: May 30, 2003

(65) Prior Publication Data

US 2004/0042428 A1 Mar. 4, 2004

(30) Foreign Application Priority Data

Jun. 7, 2002 (FI) .................................. 20021094

(51) Int. Cl.
*H04B 7/216* (2006.01)

(52) U.S. Cl. .................. 370/335; 370/342; 455/410; 455/411

(58) Field of Classification Search ................ 370/335, 370/342, 350, 320, 441; 455/560, 561, 562, 455/410–411, 101–103; 342/367, 368; 375/299, 375/267, 295, 347
See application file for complete search history.

(56) References Cited

U.S. PATENT DOCUMENTS

| | | | |
|---|---|---|---|
| 4,488,155 A | | 12/1984 | Wu |
| 5,991,613 A | * | 11/1999 | Euscher et al. ............ 455/277.1 |
| 6,369,756 B1 | * | 4/2002 | Wang et al. .................. 342/367 |
| 6,408,169 B1 | * | 6/2002 | Pallonen ................... 455/277.2 |
| 6,600,445 B2 | * | 7/2003 | Li ............................... 342/368 |
| 6,731,622 B1 | * | 5/2004 | Frank et al. .................. 370/342 |
| 6,766,146 B1 | * | 7/2004 | Park et al. ....................... 455/69 |
| 6,859,503 B2 | * | 2/2005 | Pautler et al. ............... 375/299 |
| 6,907,094 B2 | * | 6/2005 | Matsui et al. ............... 375/347 |
| 7,069,051 B1 | * | 6/2006 | Katz ......................... 455/562.1 |
| 7,200,368 B1 | * | 4/2007 | Hottinen et al. ............. 455/101 |
| 7,403,748 B1 | * | 7/2008 | Keskitalo et al. ............ 455/101 |
| 2002/0168946 A1 | * | 11/2002 | Aizawa et al. ................ 455/82 |
| 2003/0125025 A1 | * | 7/2003 | Lim ........................... 455/435 |
| 2004/0127257 A1 | * | 7/2004 | Raghothaman et al. ..... 455/560 |

FOREIGN PATENT DOCUMENTS

EP 1 204 161 A1 5/2002

* cited by examiner

*Primary Examiner*—CongVan Tran
(74) *Attorney, Agent, or Firm*—Squire, Sanders & Dempsey L.L.P.

(57) ABSTRACT

The invention relates to a method and a WCDMA radio system implementing the method wherein a connection between terminal devices and a base transceiver station is ensured by changing the transmission mode of a signal from a beamforming mode to a single antenna mode in a situation wherein calibration of an antenna array of the base transceiver station resides below a threshold value describing the quality of the calibration. The method comprises determining, at the base transceiver station, a calibration quality indicator describing the quality of calibration of the antenna array; checking whether the determined calibration quality indicator resides below a calibration quality threshold value, the calibration quality threshold value being a predetermined value; and switching over to using an antenna element specific transmission when the calibration quality indicator resides below the calibration quality threshold value.

31 Claims, 3 Drawing Sheets

SECURING A CONNECTION IN A RADIO SYSTEM

FIELD

The invention relates to a method and a WCDMA radio system implementing the method for securing a connection.

BACKGROUND

In the future, as wireless data transfer becomes increasingly common and the number of users increases, it is crucially important to increase the capacity of a system by enhancing the performance of the system. One solution to this is to use antenna arrays in transmission and reception, which enables directional beams and antenna diversity to be used. Such beams enable a radio signal to be allocated to a base transceiver station cell area in a controlled manner, which enables a fixed or a dynamically modifiable radio coverage area to be achieved. Typically, beams are formed by means of two or more mutually correlated antenna elements by phasing and possibly by weighting signals received by the antenna elements and signals to be transmitted by such elements. Furthermore, a beam specific signal which, as far as a channel code is concerned, may differ from signals directed at other beams, can be directed at each beam. The stability of a beam structure depends on the stability of the weighting and phasing of a signal directed at each antenna element with respect to the weighting and phasing of signals directed at other antenna elements. Instability is caused e.g. by non-uniform temperature dependence of antenna elements and cabling thereof, in which case a change in temperature causes changes in the phasing and weighting of the antenna elements and, consequently, a change in the beam structure as well. Attempts are made to compensate for the changes caused by instability by calibrating the antenna elements, wherein signals directed at the antenna elements are phased and weighted such that a signal transmitted by the antenna elements is as desired. In some circumstances, however, a calibration procedure may fail e.g. due to defects in the electronic components used in calibration. The situation is particularly problematic when incoming direction estimation is carried out on the basis of insufficiently calibrated beam signals. In such a case, inter-beam handovers and inter-cell handovers and the related signalling may increase significantly, thus decreasing the capacity of the radio system. In the worst case, the entire area of the cell of a base transceiver station becomes inoperative when all connections break down.

BRIEF DESCRIPTION

An object of the invention is to provide an improved method for securing a connection when a beam structure formed by a base transceiver station is insufficient. This is achieved by a method for securing a connection in a WCDMA radio system, the method comprising using at least one beam specific pilot for channel estimation, the beam specific pilot being transmitted using at least two antenna elements of an antenna array of the base transceiver station. The invention is characterized by determining, at the base transceiver station, a calibration quality indicator describing the quality of calibration of the antenna array; checking whether the determined calibration quality indicator resides below a calibration quality threshold value, the calibration quality threshold value being a predetermined value; and switching over to using an antenna element specific pilot when the calibration quality indicator resides below the calibration quality threshold value.

Another object of the invention is to provide an improved WCDMA radio system comprising: a base transceiver station including an antenna array including at least two antenna elements for transmitting at least one beam specific pilot; and at least one terminal device for using the pilot in channel estimation. The radio system is characterized in that the base transceiver station is configured to determine a calibration quality indicator describing the quality of calibration of the antenna array; the base transceiver station is configured to check whether the determined calibration quality indicator resides below a calibration quality threshold value, the calibration quality threshold value being a predetermined value; and the base transceiver station and the terminal device are configured to use an antenna element specific pilot when the calibration quality indicator resides below the calibration quality threshold value.

The idea underlying the invention is that a base transceiver station switches over from a beamforming mode to a single antenna mode when it transmits pilots and possibly traffic channels, the result being an improved connection.

An aspect of the invention is to ensure that a connection continues to exist in a situation wherein calibration of antenna elements of a base transceiver station does not enable sufficient calibration quality to be maintained. Another aspect is the feasibility of the invention since it can be implemented by software. In some embodiments of the invention, a connection can be maintained without signalling between the base transceiver station and terminal devices, which enables uninterrupted operation of the radio system.

LIST OF FIGURES

The invention is now described in closer detail in connection with preferred embodiments and with reference to the attached drawings, in which.

DESCRIPTION OF EMBODIMENTS

The shown embodiments can be applied to telecommunication systems. One such telecommunication system is a wideband WCDMA system employing spread-spectrum data transfer. In the following, the embodiments will be described by using GPRS and UMTS radio systems as examples without, however, being restricted thereto, as is obvious to one skilled in the art.

Figure 1:
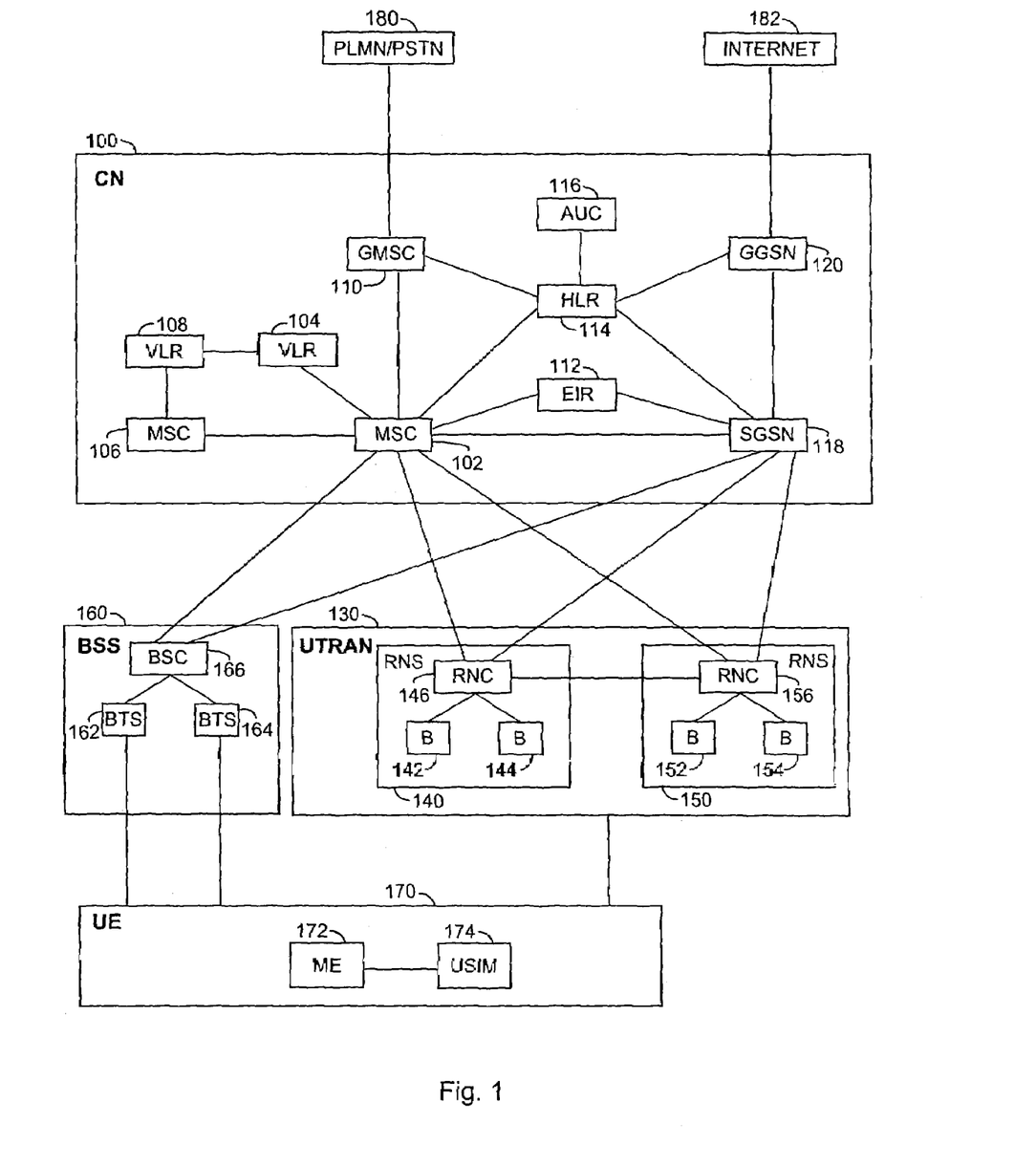
FIG. 1 is a simplified block diagram showing a telecommunication system.

Let us first examine FIG. 1 which, in a simplified manner, illustrates the structure of radio systems at a network element level. Being generally known per se, the structure and functions of the network elements are only described in rather a restricted manner. The radio-independent part of a telecommunication system is described by a core network (CN) 100. Radio systems are described by a first radio system, i.e. a radio access network UTRAN 130, and a second radio system, i.e. a base station system (BSS) 160. The term UTRAN is short for UMTS (Universal Mobile Telephone System) Terrestrial Radio Access Network, i.e. the radio access network 130 is implemented by wideband code division multiple access (WCDMA) technology. The figure also shows user equipment (UE) 170. The base station system 160 is implemented by time division multiple access (TDMA) technology.

On a general level, the radio system can also be defined to comprise user equipment, also known as a terminal device and a mobile phone, for instance, and a network part, which comprises all the fixed infrastructure of the radio system, i.e. a core network, a radio access network and a base station system.

The structure of the core network 100 corresponds to a combined structure of the GSM (Global System for Mobile Communication) and GPRS (General Packet Radio Service) systems. The GSM network elements are responsible for establishing circuit-switched connections, and the GPRS network elements are responsible for establishing packet-switched connections; some of the network elements are, however, included in both systems.

A mobile services switching center (MSC) 102 is the center point of the circuit-switched side of the core network 100. The same mobile services switching center 102 can be used to serve the connections of both the radio access network 130 and the base station system 160. The tasks of the mobile services switching center 102 include e.g.: switching, paging, user equipment location registration, handover management, collection of subscriber billing information, information encryption parameter management, frequency allocation management, and echo cancellation. The number of mobile services switching centers 102 may vary: a small network operator may only have one mobile services switching center 102 while large core networks 100 may have several.

Large core networks 100 may have a separate gateway mobile services switching center (GMSC) 110, which takes care of circuit-switched connections between the core network 100 and external networks 180. The gateway mobile services switching center 110 is located between the mobile services switching centers 102, 106 and the external networks 180. An external network 180 can, for instance, be a public land mobile network (PLMN) or a public switched telephone network (PSTN).

A home location register (HLR) 114 contains a permanent subscriber register, i.e. the following information, for instance: an international mobile subscriber identity (IMSI), an international mobile subscriber ISDN number (MSISDN), an authentication key, and when the radio system supports the GPRS, a packet data protocol (PDP) address.

A visitor location register (VLR) 104 contains roaming information on user equipment 170 in the area of the mobile services switching center 102. The visitor location register 104 contains almost the same information as the home location register 114 but in the visitor location register 104, the information is only kept temporarily.

An equipment identity register (EIR) 112 contains the international mobile equipment identities (IMEI) of the user equipment 170 used in the radio system, and a so-called white list, and possibly a black list and a grey list.

An authentication center (AuC) 116 is always physically located in the same place as the home location register 114, and contains a subscriber authentication key Ki and a corresponding IMSI.

The network elements shown in FIG. 1 are functional entities whose physical implementation may vary. Usually, the mobile services switching center 102 and the visitor location register 104 form one physical device while the home location register 114, the equipment identity register 112 and the authentication center 116 form another physical device.

A serving GPRS support node (SGSN) 118 is the center point of the packet-switched side of the core network 100.

The main task of the serving GPRS support node 118 is to transmit and receive packets with the user equipment 170 supporting packet-switched transmission by using the radio access network 130 or the base station system 160. The serving GPRS support node 118 contains subscriber and location information concerning the user equipment 170.

A gateway GPRS support node (GGSN) 120 is the packet-switched side counterpart to the gateway mobile services switching center 110 of the circuit-switched side with the exception, however, that the gateway GPRS support node 120 must also be capable of routing traffic from the core network 100 to external networks 182, whereas the gateway mobile services switching center 110 only routes incoming traffic. In our example, external networks 182 are represented by the Internet.

The first radio system, i.e. the radio access network 130, is made up of radio network subsystems (RNS) 140, 150. Each radio network subsystem 140, 150 is made up of radio network controllers (RNC) 146, 156 and nodes B 142, 144, 152, 154. Since node B is a rather abstract concept, it is often replaced by the term "base transceiver station", to which node B also corresponds.

The radio network controller 146 controls nodes B 142, 144. In principle, the aim is that devices implementing the radio path and their functions reside in nodes B 142, 144, while control devices reside in the radio network controller 146.

The radio network controller 146 takes care of the following tasks, for instance: radio resource management of node B 142, 144, intercell handovers, frequency control, i.e. frequency allocation to nodes B 142, 144, management of frequency hopping sequences, time delay measurement on the uplink, implementation of the operation and maintenance interface, and power control.

Node B 142, 144 contains at least one transceiver for implementing a WCDMA radio interface. Typically, one node B serves one cell, but it is also possible to have a solution in which node B serves several sectored cells. The diameter of a cell can vary from a few meters to dozens of kilometers. The tasks of node B 142, 144 include e.g.: calculation of timing advance (TA), uplink measurements, channel coding, encryption, decryption, and frequency hopping.

The second radio system, i.e. the base station system 160, comprises a base station controller (BSC) 166 and base transceiver stations (BTS) 162, 164. The base station controller 166 controls the base transceiver station 162, 164. In principle, the aim is that devices implementing the radio path and their functions reside in the base transceiver station 162, 164, while control devices reside in the base station controller 166. The base station controller 166 takes care of substantially the same tasks as the radio network controller 146.

The base transceiver station 162, 164 contains at least one transceiver whose each carrier provides eight time slots, i.e. the transceiver implements eight physical channels on each carrier. Typically, one base transceiver station 162, 164 serves one cell, but it is also possible to have a solution in which one base transceiver station 162, 164 serves several sectored cells. The base transceiver station 162, 164 is also considered to include a transcoder, which carries out the conversion between the speech coding format used in the radio system and the speech coding format used in the public switched telephone network. In practice, however, the transcoder is usually physically located in the mobile services switching center 102. The tasks of the base transceiver station 162, 164 include the same ones as those of node B.

The user equipment 170 comprises two parts: mobile equipment (ME) 172 and a UMTS subscriber identity module (USIM) 174. The USIM 174 contains information related to the user and information related to information security in particular, for instance an encryption algorithm. The user equipment 170 contains at least one transceiver for implementing a radio link to the radio access network 130 or to the base station system 160. The user equipment 170 can contain at least two different subscriber identity modules. In addition, the user equipment 170 contains an antenna, a user interface and a battery.

Figure 2:
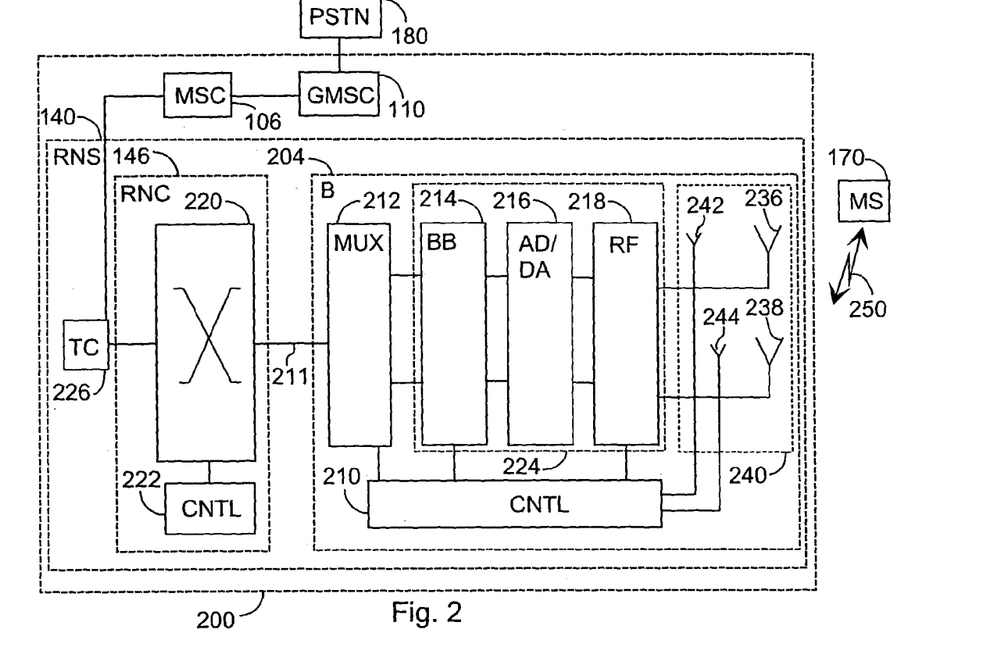
FIG. 2 is another simplified block diagram showing a telecommunication system.

The description disclosed in FIG. 1 is at a rather general level, so a more detailed example of a cellular radio system will be given in FIG. 2. FIG. 2 only includes the most essential blocks but it is obvious to one skilled in the art that a conventional cellular radio network also includes other functions and structures that need not be explained in closer detail herein. The details of a cellular radio system may differ from those shown in FIG. 1, but these differences are irrelevant to the disclosed solution.

FIG. 2 shows a mobile services switching center 106, a gateway mobile services switching center 110, which takes care of the connections of a mobile telephone system to the external world, herein to a public switched telephone network 180, and a network part 200 and terminal devices 170.

A cellular radio network typically comprises the infrastructure of a fixed network, i.e. a network part 200 and terminal devices 170. The network part 200 comprises base transceiver stations 204. A base transceiver station corresponds to node B 142, 144 in FIG. 1. A plural number of base transceiver stations 204 is, in turn, controlled in a centralized manner by a radio network controller 146 communicating with them and comprising a group switching field 220 and a control unit 222. The group switching field 220 is used for connecting speech and data and for combining signalling circuits. The control unit 222, in turn, performs call control, mobility management, collection of statistical data and signalling.

The base transceiver station 204 and the radio network controller 146 form a radio network subsystem 140 which further comprises a transcoder 226, which converts different digital speech coding forms used between a public switched telephone network and a radio network into compatible ones, for instance from a fixed network form to another cellular radio network form, and vice versa.

The base transceiver station 204 comprises a control unit 210, a multiplexer unit 212, a transceiver 224 and an antenna array 240.

A multiplexer 212 is used for arranging the traffic and control channels used by several transceivers 224 to a single transmission connection 211. In transmission, one transmission connection 211, in turn, is divided for traffic and control channels used by the transceiver 224. The control unit 210, in turn, controls the operation of the transceiver 224 and the multiplexer unit 212. The control unit 210 determines e.g. the antenna weights by which the signals of the antenna array 240 are weighted and phased in transmission and reception. The antenna weights can be presented in a complex form $W_k(A_k, \phi_k) = A_k e^{i\Phi_k}$, wherein $A_k$ is the amplitude of an antenna element k of the antenna array 240 and $\phi_k$ is the phase of the antenna element k. Symbol i is an imaginary unit and e is Neper's number. The antenna weighting of the entire antenna array 240 can preferably be presented by an antenna weight vector $W = (W_1, \ldots, W_k, \ldots W_N)^T$.

The transceiver 224 comprises at least two feeding lines of the antenna array 240 wherein in each feeding line, a signal of each antenna element 236, 238 can be treated separately. The feeding lines comprise, located in the transceiver 224, a base band block 214, an A/D converter unit 216 and a radio frequency unit 218.

The radio frequency unit 218 comprises e.g. frequency converters for up-converting baseband signals to a radio frequency and for down-converting radio-frequency signals to baseband. The radio frequency unit 218 further comprises antenna amplifiers for amplifying signals and duplex filters for separating the signals to be received and transmitted from each other.

The A/D converter unit 216 comprises analogue-digital converters for sampling the signals received by the antenna array 240 and for converting digital signals to be transmitted from the antenna array 240 into an analogue form.

The base band (BB) block 214 typically comprises a digital signal processor, ASIC (Application-Specific Integrated Circuit) circuits, buses, memory means and software for executing e.g. signal coding, decoding and weighting and phasing signals to be transmitted and signals that have been received. Furthermore, the base band block 214 is used for error correction functions and possibly bit interleaving and deinterleaving.

The antenna array 240 forms a phased antenna array comprising at least two antenna elements 236, 238 used for implementing a radio connection 250 to the user equipment 170. In the phased antenna array, the mutual distance between the antenna elements is typically approximately half the wavelength of the radio wave used in the radio system. This enables the beams being formed to be controlled in a ±90° sector without intra-sector spurious beams. In the phased antenna array, the antenna elements 236, 238 are capable of forming a coherent electromagnetic field whose level curves form a beam-like radiation pattern. The antenna elements 236, 238 typically form a uniform linear antenna array, in which case the correlation between the antenna elements 236, 238 depends on their location in the antenna array 240 as well as on the characteristics of the radio channel, such as angular divergence. In the present application, the antenna elements 236, 238 are designated by an index k whose values are determined by limits $2 \leq k \leq N$ and $N > 1$. The antenna array 240 can be used for forming e.g. a grid of fixed beams, in which case each beam forms an area of its own in the coverage area of the base transceiver station 204, which area may partly or completely overlap with the rest of the beams. Usually, completely overlapping beams mean different polarization, which is achieved e.g. by a cross-polarized antenna configuration known per se.

The antenna array 240 transmits a signal in a single antenna mode when the signal is transmitted using one antenna element 236, 238. The antenna array 240 transmits a signal in a beamforming mode when the signal is transmitted using at least two antenna elements 236, 238. In addition to a fixed beam method, the phased antenna array may be used for so-called user specific beamforming wherein the aim is to transmit the signal of each user by means of a narrow beam in an alleged direction of the user equipment 170. In the user specific beamforming, the aim is often also to monitor the movement of the user equipment 170. Both the fixed beam method and the user specific beamforming achieve high data transfer capacity, increase the coverage area of the base transceiver station 204, and decrease interference between channels.

Figure 3:
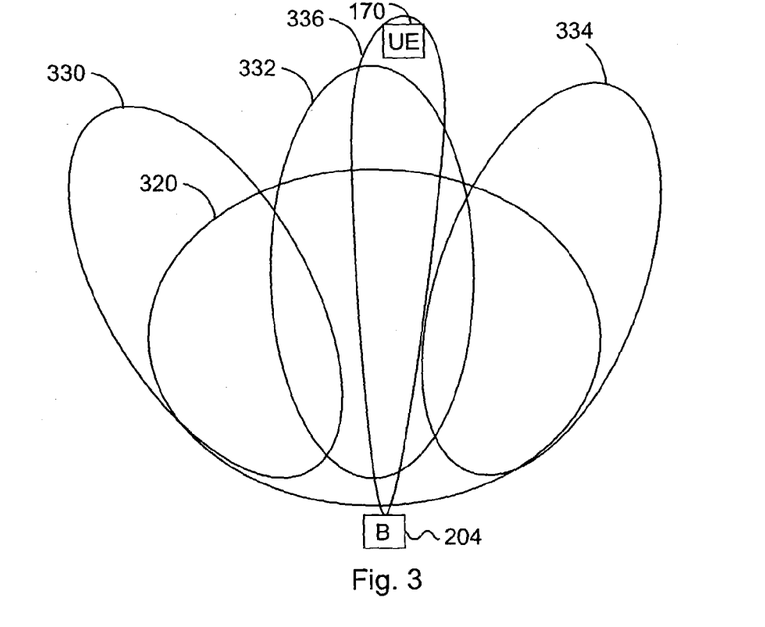
FIG. 3 shows a beam structure formed by a base transceiver station.

Referring to FIG. 3, radiation patterns formed by the antenna array 240 of the base transceiver station 204 are shown by way of example. Each antenna element 236, 238 of the antenna array 240 separately forms a radiation pattern resembling a radiation pattern 320. Radiation patterns 330, 332, 334, in turn, are fixed beams, being formed by a combined effect of the antenna elements 236, 238. A beam 336 is a beam to be directed user-specifically, and one or more such beams may be provided. In the disclosed solution, the base transceiver station 204 is capable of simultaneously producing cell covering radiation patterns 320, fixed beams 330, 332, 334, and user specific beams 336. In order to facilitate the description, FIG. 3 also shows user equipment 170 which may be located anywhere in the cell of the base transceiver station 204. The disclosed solution is not restricted to the beam structure or number of beams shown in FIG. 3, but a beam structure may be formed in the environment of the base transceiver station 204 in whatever manner.

Beamforming and routing of traffic and control channels may be implemented in to desired antenna elements 236, 238 e.g. digitally in a digital signal processor of the base band block 214 wherein signals directed at different antenna elements 236, 238 can be weighted e.g. by a digital Butler matrix. In such a case, the signals can be transmitted to certain beams 330, 332, 334, 336 or to a radiation pattern 320 formed by one antenna element 236, 238. Beams can also be formed analogously e.g. in the radio frequency unit 218, utilizing prior art.

In order to achieve and maintain a desired beam structure, the antenna array 240 may be calibrated. Calibration comprises determining and compensating for distortion of antenna weights generated in the feeding lines of the antenna elements 236, 238 such that the antenna weights of the antenna elements 236, 238 remain within their error limits, being of the size of desired target antenna weights $W_k^t(A_k^t, \phi_k^t)$. In a broader sense, calibration aims at enabling a desired signal to be allocated to each point of the area of the cell of the base transceiver station 204 at a desired power level. Typically, a need to calibrate an antenna array 240 arises because the feeding lines of the antenna elements 236, 238 do not work in an ideal manner or changes take place on the radio path. Calibration can be carried out e.g. by using at least two calibration sensors 242, 244 in the antenna array 240 for measuring the signal of the antenna elements 236, 238. The measurement may be performed on the radio output of the antenna elements 236, 238, in which case the calibration sensors 242, 244 do not necessarily have to be in physical contact with the antenna elements 236, 238. The measurement may also be performed directly on the signals directed at the antenna elements 236, 238, in which case a calibration signal can be measured at some point of the feeding line of the antenna elements 236, 238. The calibration sensors 242, 244 may be antenna specific, in which case the signal of each antenna element 236, 238 is measured by each calibration sensor 242, 244. The calibration signals formed by the calibration sensors 242, 244 are supplied to a calibration unit, which resides e.g. in the control unit 210 of the base transceiver station 204.

Calibration may be implemented e.g. such that each antenna element 236, 238 is calibrated separately. In such a case, the control unit 210, for instance, asks the transceiver 224 to transmit a calibration signal to each antenna element k 236, 238 of the antenna array 240 by using a test antenna weight $W_k^{te}(A_k^{te}, \phi_k^{te})$, a measured antenna weight $W_k^m(A_k^m, \phi_k^m)$ being determined from a signal produced by such an antenna element. The measured antenna weights $W_k^m(A_k^m, \phi_k^m)$ are compared to target antenna weights $W_k^t(A_k^t, \phi_k^t)$, which are weights by which the antenna elements 236, 238 produce signals when they work in an ideal manner. An object of a calibration procedure is to determine calibration coefficients $C_k^c(a_k^A, a_k^\Phi)$, which are used for weighting the test antenna weights $W_k^{te}(A_k^{te}, \phi_k^{te})$ such that the measured antenna weights $W_k^m(A_k^m, \phi_k^m)$ can be brought to correspond to the target antenna weights $W_k^t(A_k^t, \phi_k^t)$ within the limits of the given error limits. For example, the test antenna weight weighted by a calibration weighting coefficient of the antenna element k is of the form $W_k(a_k^A A_k, a_k^\Phi \phi_k)$. After the calibration has been carried out, the actual, predetermined antenna weights to be used in beamforming are weighted by the calibration coefficients determined in the calibration procedure, and all transmitted signals are weighted by a calibrated antenna weight. In addition, each signal of a single user has a user specific weighting of its own. The calibration process may also be carried out by replacing the antenna weights $W_k$ by phase angles $\phi_k$ but, as far as the disclosed solution is concerned, antenna parameters as such are irrelevant as long as the parameters enable the desired calibration to be achieved.

Still referring to FIG. 3, let us examine pilots used in a radio system. A pilot is generally known as a signal according to the radio system standard and transmitted between the base transceiver station 204 and the user equipment 170, comprising a symbol sequence previously known to the base transceiver station 204 and the user equipment 170 and being used for setting up and maintaining a connection between the base transceiver station 204 and the user equipment 170. Setting up and maintaining a connection comprise generating a channel estimate by the user equipment 170. Common pilots are pilots that are used for signalling between the base transceiver station 204 and the terminal devices 170 and that are typically delivered using common pilot channels (CPICH).

A type of a common pilot is a cell specific pilot, which typically comprises a primary spreading code and which is transmitted to a radiation pattern 320 covering the cell of the base transceiver station 204. A cell specific pilot is typically used for determining the size of a cell or a sector. The cell specific pilot produces a default phase reference for the physical channels, such as a synchronization channel (SCH) and a primary common control physical channel (P-CCPCH). In the WCDMA system, the cell specific pilots are delivered using a primary common pilot channel (P-CPICH).

Another type of a common pilot is a connection specific pilot which, in addition to spreading codes, is encoded by random, typically 256-bit channel codes. The user equipment 170 may then be configured to use some of the connection specific pilots by using a decoding code corresponding to the spreading-coding of the pilot. In the case of fixed beams, a pilot is usually transmitted beam-specifically, in which case the particular connection specific pilot is transmitted to a fixed beam 330, 332, 334 dedicated to the particular pilot. Particularly in the WCDMA system, beams related to connection specific common pilots are directed fixedly. Selection of the most advantageous beam 330, 332, 334 for the user equipment 170 and, simultaneously, selection of a pilot, may be based e.g. on the base transceiver station 204 determining the location of the user equipment 170, which is typically based on using a DoA (Direction of Arrival) estimate known per se, the DoA estimate being formed by the base transceiver station 204 on the basis of a signal transmitted by the user equipment 170. The same connection specific pilot can be used by one or more terminal devices 170 if the terminal devices 170 reside within the area of the same beam 330, 332, 334. At its simplest, the DoA estimate is determined such that the base transceiver station 204 measures the transmission power of the user equipment 170, using each beam 330, 332, 334 alternately, and selects the receiving beam based on the strongest measured signal. If necessary, after determining the location of the user equipment 170, the base transceiver station 204 may transmit a command to change beams to the user equipment 170 by using higher level signalling, such as a downlink forward access channel (FACH), on the basis of which the user equipment 170 is configured to listen to the correct pilot. For example, the user equipment 170 shown in FIG. 3 may be determined to listen to a connection specific pilot directed at the beam 332. Particularly in the WCDMA system, the connection specific pilot operates as a phase reference e.g. for a downlink dedicated physical channel (DPCH). In the WCDMA system, the connection specific pilots are delivered using secondary common pilot channels (S-CPICH).

In addition to the above-mentioned pilots transmitted from the base transceiver station 204 on the common pilot channels, radio systems may employ so-called dedicated pilots, which are transmitted on dedicated pilot channels that are typically mapped to a downlink dedicated physical control channel (DPCCH). The downlink dedicated physical control channel, in turn, may be part of a dedicated physical channel (DPCH), which may further include a downlink dedicated physical data channel (DPDCH). The above-mentioned dedicated channels are characterized in that they can be transmitted to user specific beams 336, the dedicated pilot thus typically being user specific, in which case each dedicated pilot is only used by one terminal device 170. In the case of the user specific beamforming, the dedicated pilot produces a phase reference e.g. for the downlink dedicated physical channel (DPCH). The performance, such as capacity, of the cell of the base transceiver station 204 largely depends on the direction of the beam structure and on the stability of the direction which, in turn, depend on the calibration of the antenna array 240. The disclosed solution can be applied particularly to a situation wherein the transmission conditions of the base transceiver station 204 change such that the desired beam structure cannot be maintained or reconstructed as desired by using any one of the calibration procedures of the antenna array 240. Defects in a beam structure show in the operation of the radio system e.g. such that the terminal devices 170 within the area of the cell of the base transceiver station 204 cannot be located and, consequently, transmission signals cannot be unambiguously directed in certain directions. This, in turn, results in increased multiuser interference, connection breakdowns, unnecessary intracell inter-beam handovers as well as a dramatic increase in signalling and transmission power between the base transceiver station 204 and the user equipment 170. In the worst case, the area of the cell of the entire base transceiver station 204 becomes inoperative when all connections break down.

In the method according to the disclosed solution, the base transceiver station 204 first transmits at least one pilot beam-specifically to any one of the beams 330, 332, 334, 336 shown in FIG. 3 and formed by using at least two antenna elements 236, 238 of the antenna array 240. The pilot may be either a connection specific pilot or a dedicated pilot. The pilot is received in at least one terminal device 170. The base transceiver station 204 may simultaneously transmit other pilots or any other radio system signals to the other beams 330, 332, 334.

In connection with a predetermined calibration check, for example, a calibration quality indicator describing the quality of the calibration of the antenna array 240 is determined in the base transceiver station 204, the calibration quality indicator being designated by the letter Q. The calibration quality indicator Q can be determined e.g. in the control unit 210 of the base transceiver station 204. In an embodiment, the calibration quality indicator Q is determined in connection with calibrating the antenna array 240, in which case the calibration quality indicator can be formed e.g. using the measured antenna weights $W_k^m(A_k^m, \phi_k^m)$ and the desired antenna weights $W_k^t(A_k^t, \phi_k^t)$ or related parameters $A_k^m$, $\phi_k^m$, $At_k$ and $\phi_k^t$. In an embodiment, the calibration quality indicator Q is formed by antenna element specific calibration quality indicators $Q_k$, which describe separately the quality of the calibration of each antenna element k. In an embodiment, the antenna element specific calibration quality indicator $Q_k$ is a function $Q_k(\phi_k^t, \phi_k^m)$ of a phase $\phi_k^m$ measured by an antenna element k and a desired phase $\phi_k^t$ of the antenna element k. The function $Q_k(\phi_k^t, \phi_k^m)$ may be a difference $Q_k(\phi_k^t, \phi_k^m) = \phi_k^t - \phi_k^m$ or it may have a more complex functional form.

In another embodiment, the calibration quality indicator is determined on the basis of how well the base transceiver station 204 is capable of determining the location of the user equipment 170. The location of the user equipment 170 can be determined e.g. such that a signal is transmitted from the user equipment 170 to the base transceiver station 204, on the basis of which signal the base transceiver station 204 forms a calibration quality indicator for the antenna array. In an embodiment, the base transceiver station 204 forms a direction estimate for the user equipment 170 by using a signal transmitted by the user equipment 170, the direction estimate then being used for forming a calibration quality indicator. A direction estimate is a variable which comprises information on the location of the user equipment 170. The direction estimate can be determined based e.g. on a DoA direction estimate known per se. The direction estimate can be formed e.g. in the control unit 210 of the base transceiver station. On the basis of the direction estimate, the base transceiver station is able to infer e.g. how unambiguously the location of the user equipment 170 can be determined in the area of any one of the beams 330, 332, 334. Unambiguity may be based e.g. on statistical characteristics of the direction estimate. The calibration quality indicator may then be formed e.g. of a variance of the direction estimate by which the user equipment 170 identifies with each beam 330, 332, 334. The calibration quality indicator describes the goodness of the calibration of the antenna array 240, and usually the accuracy achieved by the calibration of the antenna array 240 and the meaning of the accuracy of the calibration for the operation of the radio system are previously known. Therefore, it is advantageous to determine a calibration quality threshold value to set a limit for the goodness of calibration, below which value the calibration of the antenna array 240 is not to drop. In the disclosed solution, it is checked in the base transceiver station 204 whether or not the determined calibration quality indicator Q resides below the predetermined quality threshold. The check can be carried out e.g. in the control unit 210 of the base transceiver station 204. When the calibration quality indicator is determined in connection with calibrating the antenna array 240, the calibration quality threshold value can be e.g. the largest allowed deviation between the measured antenna weights $W_k^m(A_k^m, \phi_k^m)$ and the desired antenna weights $W_k^t(A_k^t, \phi_k^t)$. When the calibration quality indicator is determined from the direction estimate of the user equipment 170, the calibration quality threshold value can be formed e.g. from the variance of the direction estimate. For example, if the user equipment identifies with three beams 330, 332, 334 by weights of equal size, the calibration quality indicator can be considered to reside below the calibration quality threshold value. It is obvious to one skilled in the art that a calibration quality indicator and a calibration quality threshold value are variables which both, in one way or another, describe the capability of the antenna array 240 to form a controlled beam structure. Consequently, in a broad sense, comparing the calibration quality indicator and the calibration quality threshold value means comparing the quality of calibration indicated by the particular quality variables.

A calibration procedure can be implemented and the state of the calibration can easily be determined in the control unit 210 of the base transceiver station 204 by software. The disclosed solution can then be implemented within the limits set by the radio system standard.

If the calibration quality indicator resides below the calibration quality threshold value, the radio system is deemed to be malfunctional. In such a case, the radio system switches over to using at least one antenna element specific pilot for securing connections. In this connection, the above-mentioned switching over is called a switch-over. The antenna element specific pilot is a pilot which is transmitted using only one antenna element 236, 238. The antenna element specific pilot may be cell specific or connection specific.

Figure 4:
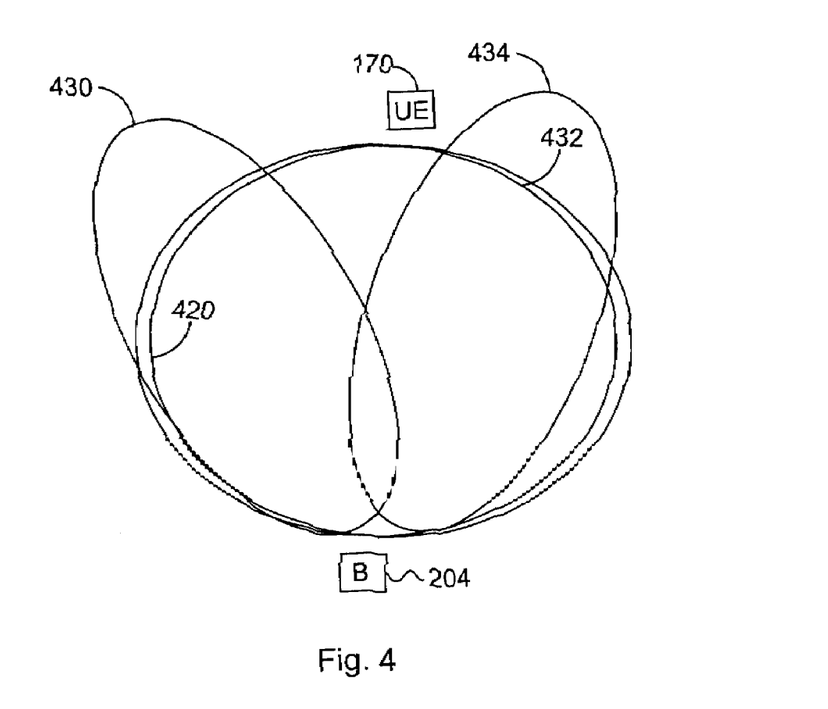
FIG. 4 shows a beam structure of the invention.
Figure 5:
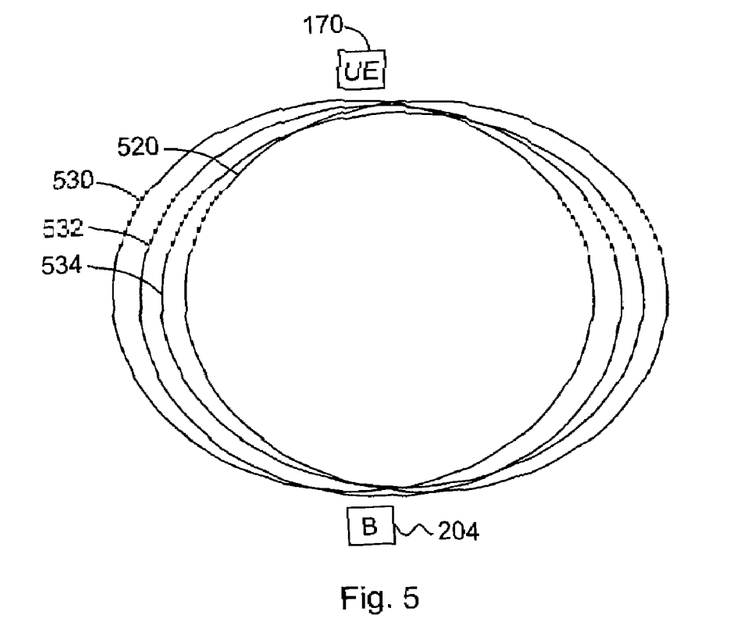
FIG. 5 shows another beam structure of the invention.

Let us now, by means of FIGS. 3, 4 and 5, examine an embodiment wherein the process switches over from using a connection specific beam specific pilot to using a connection specific-antenna element specific pilot. In such a case, the pilot does not necessarily change but the radiation pattern related to the pilot does change. When the pilot remains unchanged, no signalling of handover commands of the base transceiver station 204 to the user equipment 170 is necessary, the result being that the resources of the base transceiver station 204 and the user equipment may be used continuously. It is also possible to switch over from a single antenna mode back to a beamforming mode uninterruptedly if calibration malfunction or interference caused by the environment in the coverage area of the base transceiver station 204 no longer exists.

FIG. 4 shows a situation wherein one beam 332 is removed from the beamforming mode of the base transceiver station 204 while one antenna element 236, 238 of the antenna array switches over to transmit a connection specific pilot antenna-element-specifically. Advantageously, e.g. a beam having a terminal device 170 whose direction estimate has been found to be unreliable is selected as the beam for antenna specific transmission. In such a case, beams 430, 434 exceeding the threshold value may continue their operation in the beamforming mode. The antenna weight vector of the beam that has switched over to a single antenna mode can be presented in the form $W=(0, \ldots, W_k, \ldots 0)^T$, wherein an antenna weight $W_k$ of only one antenna element deviates from zero, e.g. $W_k=1$. The antenna element k that has switched over to the antenna element specific pilot transmission now forms an antenna element specific radiation pattern 432, whereto the connection specific pilot previously transmitted to the beam 332 of FIG. 3 as well as the other channels previously transmitted to the beam 332 of FIG. 3 can now be transmitted. The radiation pattern 432 either partly or completely covers the cell of the base transceiver station 204; consequently, the user equipment 170 is most probably capable of uninterruptedly using a connection thus set up. The coverage areas of the beams 430, 434 may remain unchanged with respect to the way they were prior to the switch-over to antenna element specific pilot transmission, and the same pilot channels and channels using the particular pilot channels as their phase references as were transmitted to the beams 330, 334 prior to the switch-over may still be transmitted to the beams 430, 434.

In the example illustrated by FIG. 5, all antenna beams 330, 332, 334 switch over to the single antenna mode, and the process switches over to transmitting all connection specific pilots transmitted by the base transceiver station 204 and channels using the particular pilots as their phase references antenna-element-specifically while the pilots and channels remain unchanged. In such a case, the beams 330, 332, 334 are completely replaced by antenna element specific radiation patterns 530, 532, 534, a connection specific pilot being transmitted to each of them separately. The antenna element specific radiation patterns 530, 532, 534 formed by each antenna element 236, 238 may be partly or completely overlapping. The radiation patterns 520, 530, 532, 534 shown in FIG. 5 overlap one another in order to make the radiation patterns easier to distinguish from each other. If necessary, the number of connection specific pilots to be transmitted to the radiation patterns 530, 532, 534 can be reduced in order to decrease multiuser interference, in which case the base transceiver station 204 has to transmit a command to change pilots to those terminal devices 170 that are compelled to change the connection specific pilot for another one. In an embodiment, it is advantageous to transmit the connection specific pilots and channels from the antenna elements 236, 238 such that the load of the feeding lines of the transceiver 224 is as similar as possible between different feeding lines. In an embodiment, the base transceiver station 204 aims at serving the terminal devices 170 that are not in a state of cell re-selection. In such a case, the cell reselection state can be cancelled by cell breathing and by weakening the cell specific pilot of the cell of the base transceiver station 204, whereby the user equipment 170 moves over to the cell of an adjacent base transceiver station, releasing resources of the base transceiver station 204.

The same cell specific pilot as was transmitted to the radiation pattern 320 prior to the switch-over to the single antenna transmission of the connection specific pilot can still be transmitted to the radiation patterns 420, 520. It is advantageous to transmit the cell specific pilot from any one of the least loaded antenna elements 236, 238 of the antenna array 240; this procedure enables an even load for the feeding lines of the transceiver 224 and a good degree of utilization of the transmission resources of the downlink of the base transceiver station 204 to be achieved.

Two situations were disclosed above by way of example, the first showing one beam switching over to a single element mode and the second showing all beams switching over to a single element mode. It is obvious to one skilled in the art that the disclosed solution can also be implemented by using an intermediate form of the previous examples, wherein more than one beam is switched over to transmitting in a single antenna mode.

In an embodiment, the process switches over from using a connection specific-beam specific pilot to using an antenna element specific-cell specific pilot. FIG. 3 shows a radiation pattern 320 and beams 330, 332, 334 prior to the switch-over, wherefrom a connection specific pilot is transmitted e.g. to a beam 332. The structure after the switch-over is illustrated by FIG. 4 wherein a beam 430 corresponds to the beam 330 in FIG. 3, and a beam 434 to the beam 334 in FIG. 3. The pilots and channels to be transmitted to the beams 430 and 434 may remain unchanged in the switch-over. Now, however, the connection specific pilot to be transmitted to the beam 332 previously shown in FIG. 3 is lost, and the user equipment 170 switches over to using the antenna element specific-cell specific pilot to be transmitted to the radiation pattern 420. Prior to switching over to the antenna element specific pilot transmission mode, a command to change pilots is transmitted from the base transceiver station 204, received by the user equipment 170. The command to change pilots may be executed e.g. by means of radio link control (RLC) information, which is mapped e.g. to a forward access channel (FACH). Next, an acknowledgement of the command to change pilots is transmitted from the user equipment 170 to the base transceiver station 204, which can be implemented e.g. by using a dedicated control channel (DCCH). Next, the acknowledgement is received by the base transceiver station 204, and the process switches over to using an antenna element specific pilot according to the command to change pilots. The traffic channels previously transmitted to the beam 332 can now be transmitted to the radiation pattern 432 formed when one antenna beam was removed from the beamforming mode. The traffic channels to be transmitted to the radiation pattern 432 use the cell specific pilot transmitted to the radiation pattern 420 as their phase reference.

In the example of FIG. 5, all beams 330, 332, 334 have switched over to a single antenna mode, and no beam structure occurs. All traffic channels are now transmitted antenna-element-specifically to the radiation patterns 530, 532, 534 such that each traffic channel is transmitted by one antenna. All traffic channels now use the cell specific pilot transmitted to the radiation beam 420 as their phase reference. In a situation wherein a plurality of antenna elements 236, 238 operating in the single antenna mode is provided, it is advantageous to transmit the cell specific pilot by using any one of the middle antenna elements 236, 238 of the antenna array 240, in which case the average distance between the rest of the antenna elements 236, 238 and the antenna element 236, 238 transmitting the cell specific pilot is as short as possible. This procedure enables the average correlation of the antenna elements 236, 238 transmitting traffic channels with the antenna element 236, 238 transmitting the cell specific pilot and, at the same time, the quality of the channel estimate of the traffic channels to be maximized. The use of the cell specific pilot enables the coverage of the pilot to be ensured in the entire cell since the energy of the cell specific pilot can be directed at one antenna element 236, 238 while at the same time the multiuser interference interfering with channel estimation is insignificant. The quality of the channel estimate may further be improved by centralizing the transmission of traffic channels in those antenna elements 236, 238 that are located in the vicinity of the antenna element 236, 238 transmitting the cell specific pilot. In such a case, some of the outermost antenna elements of the antenna arrays 240 can, at least temporarily, be put out of use.

Two situations were shown above by way of example; in the first one, one connection specific pilot was replaced by an antenna element specific-cell specific pilot and, in the second one, all connection specific pilots were replaced by an antenna element specific-cell specific pilot. It is obvious to one skilled in the art that the disclosed solution may also be implemented by using an intermediate form of the previous examples, wherein instead of two or more connection specific pilots, the process switches over to using a cell specific pilot.

In an embodiment, a user specific signal is transmitted to at least one user specific beam 336 shown by FIG. 3. When the calibration quality indicator resides below the calibration quality threshold value, the process switches over from the beam specific transmission of the user specific signal to using an antenna specific pilot, which may be either a connection specific or a cell specific pilot. The pilot to be transmitted in the single antenna mode is transmitted to an antenna element specific radiation pattern 432 similar to that shown in FIG. 4. Prior to switching over to the antenna element specific pilot transmission, the base transceiver station 204 transmits a command to change pilots to the user equipment 170 on any one of the higher level signalling channels, such as the FACH channel. Next, the user equipment 170 acknowledges the received command to change pilots and switches over to using a pilot according to the command to change pilots. After receiving the acknowledgement, the base transceiver station 204 switches over to transmitting the pilot according to the command to change pilots. If the antenna element specific pilot is a connection specific pilot, the base transceiver station 204 may later form a beam structure by its antenna elements to be calibrated and continue transmitting the connection specific pilot uninterruptedly. It is obvious to one skilled in the art that the above-disclosed embodiments can be combined within the limits defined by the radio system. In a combined embodiment, the base transceiver station 204 transmits signals via both the fixed beams and the user specific beams. When the calibration quality indicator resides below the calibration quality threshold value, the base transceiver station 204 and the user equipment 170 may apply the following combinations of the above-disclosed embodiments: switching over to using at least one connection specific pilot antenna-element-specifically; instead of beam specific-connection specific pilots, switching over to using antenna element specific-cell specific pilots; from using user specific signals, switching over to using antenna element specific-connection specific pilots; and from using user specific signals, switching over to using antenna element specific-cell specific pilots.

Since the characteristics of an antenna system usually change rather slowly without calibration, a switch-over to using antenna specific pilots can be carried out in stages, combining the above-mentioned embodiments. If the calibrated characteristics of the antenna system change rapidly, the switch-over to using antenna specific pilots may also be carried out rapidly. Criteria for selecting different embodiments are thus system specific and they depend on the calibration information available.

The invention claimed is:

1. A method, comprising:

using at least one beam specific pilot for channel estimation, the beam specific pilot being transmitted using a plurality of antenna elements of an antenna array of a base transceiver station;

determining, at the base transceiver station, a calibration quality indicator describing the quality of calibration of the antenna array;

checking whether the determined calibration quality indicator resides below a calibration quality threshold value, the calibration quality threshold value being a predetermined value; and switching over to using an antenna element specific pilot when the calibration quality indicator resides below the calibration quality threshold value.

2. The method of claim 1, wherein the method further comprises:

transmitting to a terminal device, from the base transceiver station, a command to change pilots when the calibration quality indicator resides below the calibration quality threshold value prior to a switch-over to using an antenna element specific pilot;

switching over to using an antenna element specific pilot according to the command to change pilots.

3. The method of claim 1, wherein the method further comprises:

receiving, from a terminal device, a signal at the base transceiver station; and determining, at the base transceiver station, a calibration quality indicator for the antenna array on the basis of the received signal.

4. The method of claim 1, wherein the method further comprises:

receiving, from a terminal device, a signal at the base transceiver station;

determining, at the base transceiver station, a direction estimate for the terminal device on the basis of the transmitted signal; and determining, at the base transceiver station, a calibration quality indicator for the antenna array on the basis of the determined direction estimate.

5. The method of claim 1, wherein the method further comprises:

measuring, at the base transceiver station, a signal of the antenna array; and determining, at the base transceiver station, a calibration quality indicator for the antenna array on the basis of the measured signal.

6. The method of claim 1, wherein the method further comprises:

switching over to using an antenna element specific pilot when the calibration quality indicator resides below the calibration quality threshold value such that the pilot is transmitted using any one of the least loaded antenna elements of the antenna array.

7. The method of claim 1, wherein the method further comprises:

switching over to using an antenna element specific wideband code division multiple access system primary common pilot channel pilot when the calibration quality indicator resides below the calibration quality threshold value such that the pilot is transmitted using at least one middle antenna element of the antenna array.

8. A system, comprising:

a base transceiver station including an antenna array including a plurality of antenna elements configured to transmit at least one beam specific pilot; and at least one terminal device configured to use the pilot in channel estimation, wherein the base transceiver station is configured to determine a calibration quality indicator describing the quality of calibration of the antenna array;

the base transceiver station is configured to check whether the determined calibration quality indicator resides below a calibration quality threshold value, the calibration quality threshold value being a predetermined value; and the base transceiver station and the terminal device are configured to use an antenna element specific pilot when the calibration quality indicator resides below the calibration quality threshold value.

9. The system of claim 8, wherein the base transceiver station is configured to transmit a command to change pilots when the calibration quality indicator resides below the calibration quality threshold value prior to a switch-over to transmitting a pilot from the base transceiver station antenna-element-specifically;

the terminal device is configured to receive the command to change pilots;

the terminal device is configured to transmit an acknowledgement of the command to change pilots to the base transceiver station;

the base transceiver station is configured to receive the acknowledgement; and the base transceiver station and the terminal device are configured to switch over to using a pilot according to the command to change pilots.

10. The system of claim 8, wherein the terminal device is configured to transmit a signal;

the base transceiver station is configured to receive the signal; and the base transceiver station is configured to determine a calibration quality indicator for the antenna array on the basis of the received signal.

11. The system of claim 8, wherein the terminal device is configured to transmit a signal;

the base transceiver station is configured to receive the signal;

the base transceiver station is configured to determine a direction estimate for the terminal device on the basis of the transmitted signal; and the base transceiver station is configured to determine a calibration quality indicator for the antenna array on the basis of the determined direction estimate.

12. The system of claim 8, wherein the base transceiver station is configured to measure the signal of the antenna array; and the base transceiver station is configured to determine a calibration quality indicator for the antenna array on the basis of the measured signal.

13. The system of claim 8, wherein the base transceiver station is configured to transmit an antenna element specific pilot by using any one of the least loaded antenna elements of the antenna array when the calibration quality indicator resides below the calibration quality threshold value.

14. The system of claim 8, wherein the base transceiver station is configured to transmit an antenna element specific wideband code division multiple access system primary common pilot channel pilot by using at least one middle antenna element of the antenna array when the calibration quality indicator resides below the calibration quality threshold value.

15. A system, comprising:

a base transceiver station including an array including a plurality of elements configured to transmit at least one beam specific pilot; and at least one terminal device configured to use the pilot in channel estimation, wherein the base transceiver station is configured to determine a calibration quality indicator describing the quality of calibration of an element array;

the base transceiver station is configured to check whether the determined calibration quality indicator resides below a calibration quality threshold value, the calibration quality threshold value being a predetermined value; and the base transceiver station and the terminal device are configured to use an element specific pilot when the calibration quality indicator resides below the calibration quality threshold value.

16. An apparatus, comprising:

a processor configured to use a beam specific pilot for transmitting using a plurality of antenna elements of an antenna array of a base transceiver station;

determine a calibration quality indicator describing the quality of calibration of the antenna element array;

check whether the determined calibration quality indicator resides below a calibration quality threshold value, the calibration quality threshold value being a predetermined value; and use an antenna element specific pilot when the calibration quality indicator resides below the calibration quality threshold value.

17. An apparatus, comprising:
a first using means for using a beam specific pilot for transmitting using a plurality of antenna element means of an antenna array of a base transceiver station:
a determining means for determining a calibration quality indicator describing the quality of calibration of the antenna element means for transmitting and receiving signals;
a checking means for checking whether the determined calibration quality indicator resides below a calibration quality threshold value, the calibration quality threshold value being a predetermined value; and
a second using means for using an antenna element means specific pilot when the calibration quality indicator resides below the calibration quality threshold value.

18. A method, comprising:
using a beam specific pilot for transmitting using a plurality of antenna elements of an antenna array of a base transceiver station;
determining a calibration quality indicator describing the quality of calibration of the antenna element array;
checking whether the determined calibration quality indicator resides below a calibration quality threshold value, the calibration quality threshold value being a predetermined value; and
using an antenna element specific pilot when the calibration quality indicator resides below the calibration quality threshold value.

19. The method of claim 18, further comprising:
transmitting a command to a terminal device to change pilots when the calibration quality indicator resides below the calibration quality threshold value prior to a switch-over to using the antenna element specific pilot.

20. The method of claim 18, further comprising:
receiving a signal from a terminal device; and
determining a calibration quality indicator for the antenna array on the basis of the received signal.

21. The method of claim 18, further comprising:
receiving a signal from a terminal device;
determining a direction estimate for the terminal device on the basis of the transmitted signal; and
determining a calibration quality indicator for the antenna array on the basis of the determined direction estimate.

22. The method of claim 18, further comprising:
measuring the signal of the antenna array; and
determining a calibration quality indicator for the antenna array on the basis of the measured signal.

23. The method of claim 18, further comprising:
switching over to using an antenna element specific pilot when the calibration quality indicator resides below the calibration quality threshold value such that the pilot is transmitted using any one of the least loaded antenna elements of the antenna array.

24. The method of claim 18, further comprising:
switching over to using an antenna element specific wideband code division multiple access system primary common pilot channel pilot when the calibration quality indicator resides below the calibration quality threshold value such that the pilot is transmitted using at least one middle antenna element of the antenna array.

25. The apparatus of claim 16, further comprising:
a transmitter configured to transmit a command to a terminal device to change pilots when the calibration quality indicator resides below the calibration quality threshold value prior to a switch-over to using an antenna element specific pilot.

26. The apparatus of claim 16, further comprising:
a receiver configured to receive a signal from a terminal device, wherein the processor is configured to determine a calibration quality indicator for the antenna array on the basis of the received signal.

27. The apparatus of claim 16, further comprising:
a receiver configured to receive a signal from a terminal device, wherein the processor is configured to determine a direction estimate for the terminal device on the basis of the transmitted signal and determine a calibration quality indicator for the antenna array on the basis of the determined direction estimate.

28. The apparatus of claim 16, wherein the processor is further configured to measure the signal of the antenna array and determine a calibration quality indicator for the antenna array on the basis of the measured signal.

29. The apparatus of claim 16, wherein the processor is configured to issue one or more commands for switching over to using an antenna element specific pilot when the calibration quality indicator resides below the calibration quality threshold value such that the pilot is transmitted using any one of the least loaded antenna elements of the antenna array.

30. The apparatus of claim 18, wherein the processor is configured to issue one or more commands for switching over to using an antenna element specific wideband code division multiple access system primary common pilot channel pilot when the calibration quality indicator resides below the calibration quality threshold value such that the pilot is transmitted using at least one middle antenna element of the antenna array.

31. A computer program embodied on a computer-readable medium, the computer program configured to control a processor to perform operations comprising:
using a beam specific pilot for transmitting using a plurality of antenna elements of an antenna array of a base transceiver station;
determining a calibration quality indicator describing the quality of calibration of the antenna element array;
checking whether the determined calibration quality indicator resides below a calibration quality threshold value, the calibration quality threshold value being a predetermined value; and
using an antenna element specific pilot when the calibration quality indicator resides below the calibration quality threshold value.

* * * * *